March 15, 1949.  C. A. CADWELL  2,464,210
WELDING MATERIAL AND PROCESS
Filed Jan. 29, 1945
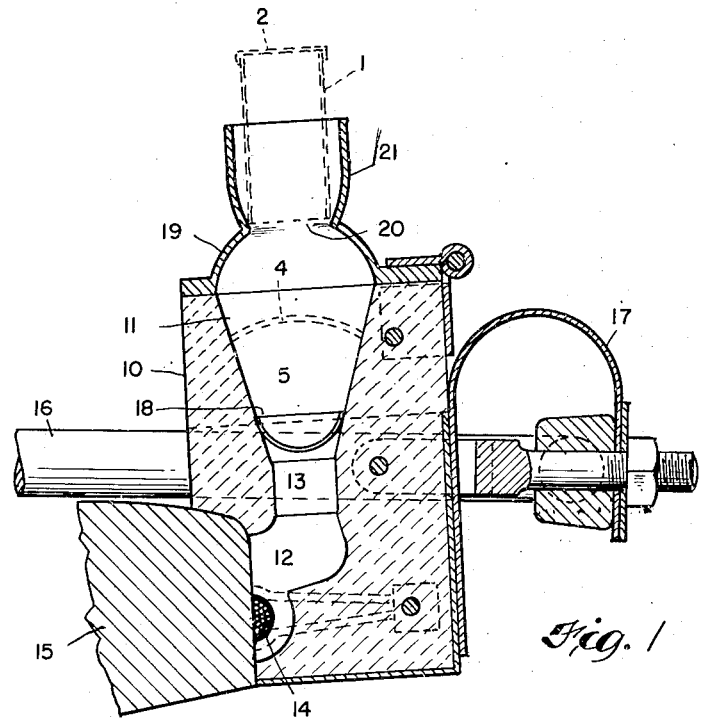
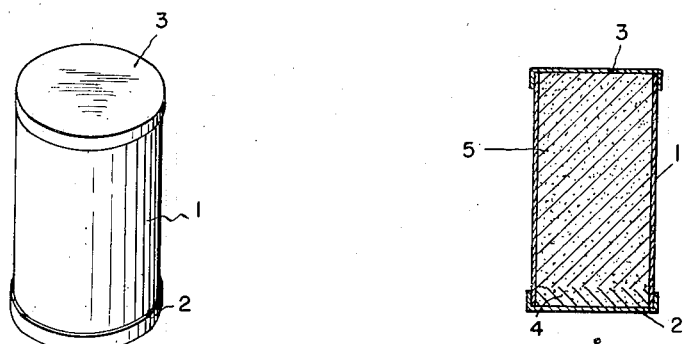
INVENTOR.
CHARLES A. CADWELL
BY
Oberlin, Limbach & Day.
ATTORNEYS Patented Mar. 15, 1949

2,464,210

UNITED STATES PATENT OFFICE 2,464,210

WELDING MATERIALS AND PROCESSES

Charles A. Cadwell, Cleveland Heights, Ohio, assignor to The Electric Railway Improvement Company, Cleveland, Ohio, a corporation of Ohio Application January 29, 1945, Serial No. 575,117

5 Claims. (Cl. 75—27)

The present improvements, relating as indicated to welding, have more particular regard to a method of welding in which the molten metal employed in the operation is produced by the exothermic reaction between a metallic oxide and a strong reducing agent. Actually the improved method and the composition utilized in the production of such molten metal are not limited to the particular use to which the latter may be put, e. g. welding, but such method and material may be employed for other purposes, as for the production of castings and the like.

In my U. S. Patent No. 2,229,045, dated January 21, 1941, I have pointed out difficulties inherent in the production of molten metallic copper by an exothermic reaction between copper oxide and aluminum and disclose a method and composition of materials whereby such reaction, generally known as the Thermit process, may be utilized, despite the great speed with which the reaction takes place and the excessive heat evolved. Briefly stated, such previously disclosed improvement resides in the use, instead of aluminum by itself, of sufficient copper as metal (preferably in the form of an alloy) with the aluminum to absorb a substantial amount of the heat generated by the reaction.

Molten copper produced by use of the material and in the manner set forth in my previous patent has been found highly satisfactory for use in welding copper bonds to steel rails. However, particularly where a charge or "shot" of molten copper is required in small amount only, as for example, in welding small size, e. g. signal, bonds to rails by copper thus exothermically produced, it is still difficult accurately to control the speed of the exothermic reaction and avoid a spattering of molten metal. The slag resulting from the reaction is alumina, $Al_2O_3$, one of our highest refractory substances, and following the reaction is found as a thin shell tightly fitting the walls of the crucible, where it has chilled from its nascent temperature. Such temperature is so high that while in fluid state, permitting movement toward the crucible wall, such slag tends to become gritty and the gases escaping from the reaction will throw out a fine spray of the slag. Furthermore, the highly heated molten copper as it drops away from such slag appears dry, i. e. is lacking in desirable flow characteristics with the result that in the operation of welding a bond to a rail satisfactory adhesion is not always obtained.

I have now discovered that by substituting for a portion of the aluminum in such exothermic charge a low heat producing metal such as calcium or magnesium, while the total amount of heat produced by the reaction is somewhat less and the resulting basic slag is not so hot, such slag forms a liquid pool, loses less heat to the walls of the crucible in which the reaction is conducted and actually follows the molten metal produced by the reaction when discharged into the mold so as actually to deliver heat more effectively to the point where required.

I have further discovered that inclusion in the charge, in substitution of a corresponding amount of aluminum, of small amounts of silicon, manganese and boron, assists in the improvement of the flow characteristics to weld metal and in the production of a silicate containing slag at the same time renders the latter easier to handle; all without noticeably reducing the welding efficiency of the hot copper. Indeed, much better welding results are obtained from such an exothermic charge containing less aluminum and more of the foregoing flow-producing metals and compounds.

It should be noted that the introduction of silicon into the mixture may be effected either in conjunction with manganese, as indicated, or in conjunction with the calcium, i. e. as manganese silicide and calcium silicide; or preferably a relatively small amount of each will be used. In addition, a similar small amount of silicon as such, i. e. in excess of that combined with the calcium and/or manganese, may be included in the reaction mixture. The inclusion of a small amount of manganese is in any event desirable in order to insure the production of metal which will have the proper flow characteristics.

To the accomplishment of the foregoing and related ends, said invention, then, consists of the means hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

In said annexed drawing:

Fig. 1 is a sectional view of a rail bonding apparatus showing the manner in which my improved exothermic reaction charge may be employed in attaching the terminal of a rail bond to a rail;

Fig. 2 is a perspective view of a cartridge wherein the charge is placed for convenient use in connection with such apparatus; and Fig. 3 is a cross-sectional view of such cartridge indicating the disposition of its contents.

As previously indicated, one of the novel ingredients employed in my improved exothermic reaction charge is calcium. Such calcium may be introduced as such in whole or in part, but preferably it will be combined with silicon, i. e. in the form of a silicide. Other silicides of metals of group II may also be utilized.

One such compound which I have found particularly desirable for use in this connection is a commercially available calcium-silicon product which analyzes from 28 to 35% calcium and from 60 to 65% silicon. I am not advised to what extent this product consists of a true silicide of calcium, but as indicated by such analysis there is a substantial excess of silicon.

In addition to employing such a metallic silicide I may also utilize aluminum or magnesium as a strong reducing agent as well as a metal such as zirconium or manganese which are relatively weaker reducing agents. In any case involving the use of the different metals just referred to it is desirable that the magnesium or aluminum be entirely burned out in the reaction. In other words, the total amount of such strong reducing element should be slightly less than required to reduce all of the copper oxide, and the difference made up by using such weaker agent.

Preferably as such strong reducing agent I employ aluminum and include therewith a sufficient amount of copper as metal, in accordance with the teaching of my above-identified patent, to absorb a substantial amount of the heat generated by the reaction.

The following is an illustrative formula for compounding a charge as described above for the production of highly heated molten copper by exothermic reaction, the indicated parts being approximate and by weight, viz.:

| | |
|---|---|
| Copper scale | 23.0 |
| Copper-aluminum alloy (60% Cu, 40% Al) | 3.3 |
| Calcium-silicon (analysis as above) | 1.5 |
| Manganese boride | .5 |
| Manganese | .5 |

The following is another example of a similar exothermic reaction charge in which magnesium is employed, instead of aluminum, as the strong reducing agent, viz.:

| | |
|---|---|
| Copper scale | 25.0 |
| Magnesium | .5 |
| Calcium-silicon (analysis as above) | 3.2 |
| Manganese | 2.5 |

The use of silicon as such in addition to the calcium-silicon product described above is illustrated by the following formula, viz.:

| | |
|---|---|
| Copper scale | 25.0 |
| Magnesium | 1.2 |
| Calcium-silicon (analysis as above) | 1.2 |
| Silicon | 1.2 |
| Manganese | 2.5 |

The use of silicon without including any such calcium-silicon product is exemplified by the following formula, viz.:

| | |
|---|---|
| Copper scale | 18.0 |
| Copper-aluminum alloy (60% Cu, 40% Al) | 3.5 |
| Silicon | .2 |
| Manganese boride | .7 |
| Manganese | .2 |

In the case of the foregoing formulas which involve the use of aluminum as a strong reducing agent, it is desirable that such metal be entirely burned out in the reaction. In other words, the total amount thereof should be slightly less than required to reduce all of the copper oxide, the difference being made up by the use of the weaker agents as described above.

For use in welding a rail bond to a rail, as illustrated in Fig. 1 of the drawing, a measured charge of the mixture of ingredients is conveniently made up in the form of a package or cartridge by being placed in a suitable container 1 having a closed bottom 2 and a removable top 3. In assembling the charge there is first placed in the bottom of such container a small layer 4 of igniting powder which may be of any well known composition, a satisfactory one being provided by adding a small proportion of red phosphorus to a mixture of finely divided copper oxide and aluminum or copper-aluminum alloy. The main body 5 of reaction material is then placed directly upon such layer of ignition powder.

The rail bonding apparatus illustrated in Fig. 1 comprises a combined mold and crucible block 10 in which the crucible 11, which may better be termed a reaction chamber, is connected with the mold cavity 12 by means of a screw 13. Such mold cavity is open on one side and formed to hold the terminal 14 of the rail bond against the head 15 of a rail or other part to which such terminal is to be welded. During the welding operation the mold is resiliently held against such rail head by a clamp arm 16 and interposed spring member 17.

A cup-shaped plug 18 composed of metal which will be melted by the heat of the reaction in the crucible chamber, or by contact of the exothermic metal therewith, is inserted at the bottom of such chamber so as to retain the charge therein until the reaction is complete.

For the purpose of properly placing the charge in the crucible, a hinged cover 19, which normally serves to close the upper end thereof, is provided with a central opening 20, aligned with the axis of the crucible chamber, an upwardly and outwardly flaring rim 21 surrounding such opening. The latter is of smaller diameter than the container 1, in which the charge is packaged as above described, so that when such container, following the removal of cap 3, is placed in an inverted position within rim 21, as shown in dotted outline in Fig. 1, its contents will be discharged into the crucible chamber and assume the form of a slightly mounded body, of which the lower main portion is composed of the main body of the charge on top of which will be superimposed a thin layer 5 consisting of the ignition powder. If now such layer of ignition powder be ignited, as by a spark, the main body of the charge will be heated to the point of reaction, the resultant molten metal will collect in the bottom of the crucible chamber, and as the plug 18 yields, will be discharged through the sprue into the mold.

Aside from the reduction of the temperature of the exothermic metal resulting from the inclusion of manganese metal and/or boride as secondary reducing agents, the presence of a slight excess of manganese which is carried over into the exothermic metal does not lead to the objectionable results that occur where over-reduction is due to an excess of aluminum in the charge. On the contrary, the excess of manganese thus entering the exothermic metal serves measurably to improve the flow characteristic of the latter. This characteristic being thus provided, the use of zinc or other element with low boiling point becomes unnecessary. Accordingly, notwithstanding the difference in heat produced by the reaction, my improved exothermic reaction mixture yields a metal which has not only a better flow characteristic but which may be applied without gouging the rail and yet stick or adhere more strongly thereto.

In conclusion I should state that I have found that at least in certain cases it is advantageous to use instead of aluminum as the main reducing agent, a mixture of aluminum and iron, preferably in the form of an aluminum-iron alloy (50–50) as illustrated by the following formula, the indicated parts being approximate and by weight, viz.:

Copper scale _____ 19
Al-Fe alloy (50–50) _____ 5

In the foregoing example the copper is assumed to consist of 12.92 parts by weight of copper oxide (CuO) and 6.08 parts of unoxidized copper. In a composition such as the foregoing, just as those previously described, it is desirable to include a small amount (approximately 2%) each of silicon in the form of silicon carbide (carborundum) and manganese boride, these additional ingredients being, as before, thoroughly intermixed with the copper scale and Al-Fe alloy. In the formula given above the corresponding parts by weight of such silicon carbide and manganese boride will be 0.5, although this will vary, particularly in the case of the boride, depending upon whether the latter is in the form of the mono- or di-compound.

Other modes of applying the principle of my invention may be employed instead of the one explained, change being made as regards the materials employed, provided the ingredients stated by any of the following claims or the equivalent of such stated ingredients be employed.

I therefore particularly point out and distinctly claim as my invention:

1. In the cast welding of copper to a steel member in which a small body of molten copper is employed as the welding agent, the steps of reacting copper oxide with a reducing agent selected from the group consisting of aluminum, magnesium, and a mixture of aluminum and iron, said reducing agent having a strong reducing action on such oxide in a proportion insufficient entirely to reduce said oxide and a weaker calcium and silicon containing reducing agent in an amount sufficient substantially to complete such reduction, the silicon in said latter reducing agent being in excess of the calcium therein, and conducting the molten copper thereby produced together with the fluid slag produced by such reaction to a mold cavity juxtaposed to such steel member, whereby sufficient heat is present in such cavity to ensure a proper weld despite the small quantity of molten copper employed.

2. In the cast welding of copper rail bonds to steel rails wherein a small body of molten copper produced by an exothermic reaction is employed as the welding agent, the steps of producing just sufficient molten copper to form the weld terminal by reacting copper oxide with an aluminum containing reducing agent having a strong reducing action on such oxide in a proportion insufficient entirely to reduce said oxide and a weaker calcium and silicon containing reducing agent in an amount sufficient substantially to complete such reduction, and conducting the molten copper thereby produced together with the fluid slag resulting from such reaction to a mold cavity having an open face juxtaposed to such steel rail and in which an end of such rail bond is positioned, whereby sufficient heat is present to cast weld such bond to such rail despite the chilling effect of such bond and rail on the small charge of molten copper employed.

3. A new composition for use in producing a charge of molten copper suitable for welding, by a metal-producing exothermic reaction, comprising a mixture of copper oxide, a reducing agent selected from the group consisting of aluminum, magnesium and a mixture of aluminum and iron, said reducing agent being adapted to react with said oxide to produce molten copper of a very high temperature, and a calcium and silicon containing reducing agent adapted to react with said oxide to produce molten copper of a lower temperature, the silicon in said latter reducing agent being in excess of the calcium therein, such latter agent also being effective simultaneously to produce a highly fluid slag.

4. A new composition for use in producing a charge of molten copper suitable for welding, by a metal-producing exothermic reaction, comprising a mixture of copper oxide, aluminum adapted to react with said oxide to produce molten copper of a very high temperature, and a calcium and silicon containing reducing agent adapted to react with said oxide to produce molten copper of a lower temperature, the silicon in said latter reducing agent being in excess of the calcium therein, such latter agent also being effective simultaneously to produce a highly fluid slag.

5. A new composition for use in producing a charge of molten copper suitable for welding, by a metal-producing exothermic reaction, comprising a mixture of copper oxide, a copper-aluminum alloy adapted to react with said oxide to produce molten copper of a very high temperature, and a calcium and silicon containing reducing agent adapted to react with said oxide to produce molten copper of a lower temperature, the silicon in said latter reducing agent being in excess of the calcium therein, such latter agent also being effective simultaneously to produce a highly fluid slag.

CHARLES A. CADWELL.

REFERENCES CITED

The following references are of record in the file of this patent:

UNITED STATES PATENTS

| Number | Name | Date |
|---|---|---|
| 688,510 | Greene et al. | Dec. 10, 1901 |
| 906,009 | Goldsmidt | Dec. 8, 1908 |
| 2,208,586 | Kemmer | July 23, 1940 |
| 2,229,045 | Cadwell | Jan. 21, 1941 |
| 2,408,291 | Cadwell | Sept. 24, 1946 |

OTHER REFERENCES

Carnegie Institute of Technology and Mining and Metallurgical Advisory Boards, "The Physical Chemistry of Steel-Making. The Control of Iron Oxide in the Basic Open-Hearth Process" (Co-operative Bulletin 68), published at Pittsburgh, 1934, pages 34 and 35.